United States Patent [19]

Gavend et al.

[11] Patent Number: 4,932,978

[45] Date of Patent: Jun. 12, 1990

[54] PROCESS AND APPARATUS FOR AUTOMATIC FINISHING OF FLEXIBLE MATERIALS, AND PARTICULARLY LEATHERS AND HIDES

[75] Inventors: Gérard Gavend; Bernard Vitteau; Bernard Vulliermet, all of Lyon, France

[73] Assignee: Centre Technique Cuir Chaussure Maroouinerie, Lyon, France

[21] Appl. No.: 207,106

[22] Filed: Jun. 14, 1988

[30] Foreign Application Priority Data

Jun. 23, 1987 [FR] France ............................... 87 09163

[51] Int. Cl.[5] ......................... D06P 3/32; C14C 5/00; B05D 1/00; G01D 15/18

[52] U.S. Cl. ....................................... 8/436; 8/115.52; 8/115.53; 204/135; 346/75; 427/54.1; 427/365; 427/366; 427/265; 427/267

[58] Field of Search .................. 8/436, 115.52, 115.53; 346/75; 204/135; 427/53.1, 54.1, 361, 365, 366, 264, 265, 267, 278

[56] References Cited

U.S. PATENT DOCUMENTS 4,268,580 5/1981 Rock et al. ....................... 428/423.4

4,698,642 10/1987 Gamblin ............................... 346/75

*Primary Examiner*—Paul Lieberman
*Assistant Examiner*—John F. McNally
*Attorney, Agent, or Firm*—Browdy and Neimark

[57] ABSTRACT

A continuous finishing process for flexible materials using a continuous printing machine of the thousand dot type. A small controlled amount of a finishing product, comprising 90 to 100% of photopolymerizable active material, is deposited at a rate of 5 to 35 g/m$^2$ per pass in the printing machine. The finishing product is then photopolymerized, and a satining or graining operation is performed. The above stages are repeated until the desired finish is obtained.

The finishing product is photopolymerizable under ultraviolet radiation and comprises unsaturated prepolymers, liquid monomers, and photoinitiators.

The apparatus comprises at least one module comprising a continuous printing machine, an ultraviolet radiation oven, and a satining or graining machine, these various machines being placed so as to achieve a continuous conveying of pieces to be treated from one machine to the other.

8 Claims, 1 Drawing Sheet

PROCESS AND APPARATUS FOR AUTOMATIC FINISHING OF FLEXIBLE MATERIALS, AND PARTICULARLY LEATHERS AND HIDES

FIELD OF THE INVENTION

This invention relates to a process and an apparatus for automatic finishing of flexible materials and leathers or hides, which are whole or precut, and the use of the resulting products in the shoe, morocco-leather, automobile, garment, saddle industries and other fields using leathers and flexible materials such as fabrics, nonwovens, papers, substitute leathers, coated or not.

BACKGROUND OF THE INVENTION

At present, finishing of leathers is generally performed semiautomatically in tanning-tawing apparatus, with whole hides. This finishing is performed in several stages, including spraying onto the hides by means of a spray gun the finishing products in solution or dispersion in a solvent or aqueous medium and in drying the hides, generally in air convection tunnels heated to 70°-80° C., these stages being repeated until a satisfactory finishing layer is obtained.

Such a finishing technique requires drying for a very long period, so as to evaporate totally the solvents or water used which constitute 80 to 95% of the finishing product, as well as very large drying installations.

Further, the drying causes a certain pollution, especially by evaporation of the solvents, and requires a great deal of storage capacity, since about 8 days are necessary to perform the finishing of a single hide.

Further, patent application GG-2 031 000 is known which describes a leather-coating product. This product is a compound photopolymerizable under UV consisting of 40 to 90% by weight of a prepolymer of acrylates and methacrylates and styrene and 10 to 60% by weight of urethane-acrylates. It does not comprise 100% of active materials but also contains nitrocellulose and is diluted in organic solvents so as to be able to be applied in batch by vaporization. Although crosslinking is performed under UV, it is necessary to wait for the total evaporation of the solvent which requires much time and involves a considerable consumption of this expensive and dangerous product. Further, it is not possible to treat the leather continuously, and the coating product can be applied only once, which considerably harms its quality.

Said finishing techniques also involve numerous handlings by repeated taking up of the hides for drying and application of the product and they therefore are generally performed in the tannery only with whole hides or ones cut into strips.

Finally, the relatively large apparatus necessary for the finishing operations require the treatment of a large number of hides to be profitable.

Now the present trend of markets located downstream from the tannery-tawery, particularly in the garment and shoe industry, is toward increasing diversity of series, corresponding to a growing demand by the clientele for new lines or stocks. This great diversity of series imposes changes in color, of finishing products, which are difficult to perform quickly because of the unwieldiness of existing installations.

SUMMARY OF THE INVENTION

The object of the invention therefore is to remedy these drawbacks and to design a finishing process and apparatus which makes it possible to shorten the finishing period to reduce the necessary stocks, to be able to respond faster to fashion trends, to shorten the delivery periods and to respond to the demands for stocks, and to perform this automatically.

The process according to the invention should also exclude the use of solvent in the finishing process, while allowing a quality finish to be obtained.

Another object of the invention is to design an apparatus for the treatment of deformable flexible materials, such as fabrics, nonwovens, papers, synthetic leathers (coated or not) and leathers, already precut, immediately before the production of shoes, garments or other articles intended for use in morocco leather goods, furniture and automobiles, among others.

This object is attained in that the process according to the invention comprises, in combination, the following successive stages performed continuously:

application to the piece with a continuous printing machine, of the thousand dot type, of a small controlled amount of a finishing product, comprising 90 to 100% of photopolymerizable active material, at a rate of 5 to 35 g/m$^2$ of the product deposited per pass of the printing machine, photopolymerization of the finishing product, performance of a satining or graining operation, these different stages being repeated until the desired finish is obtained.

Use of a finishing product with a base of 90 to 100% of active material, and therefore practically without solvent and aqueous medium, makes it possible to eliminate the evaporation phase of the traditional processes and to replace it with a simple polymerization operation using suitable radiation, this polymerization being performed very quickly and able to be performed continuously with other operations of application of the product and satining or graining of the hide.

Therefore, this process makes it possible to eliminate all the handlings by repeated taking up of the hides in the traditional process connected with the drying stages. It also makes it possible to eliminate storage of hides between two operations because the hides are treated continuously.

Finally, application of the finishing product by a printing machine of the thousand dot type makes it possible to assure the deposit on the surface of the hide of a very thin, uniform layer of this product.

According to an interesting variant of the process, the stage of application of the finishing product to the piece is preceded by a continuous dyeing stage by impregnating.

DESCRIPTION OF THE DRAWINGS

In any case, the process and apparatus according to the invention will be understood better and other of their characteristics will be brought out from the following description with reference to the accompanying drawings illustrating several embodiments of this apparatus by nonlimiting examples.

Figure 1:
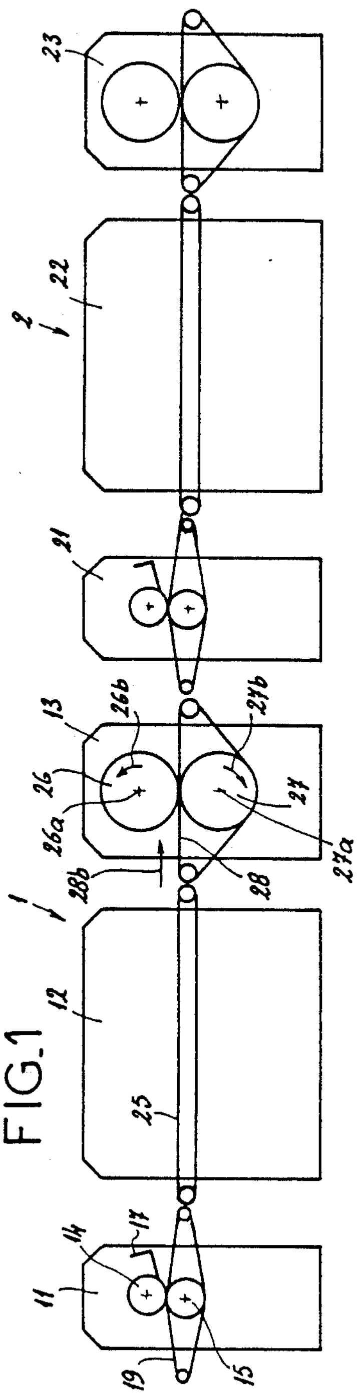
FIG. 1 is a diagram of the apparatus according to a first embodiment.

As FIG. 1 shows, the finishing apparatus according to the invention comprises a succession of machines arranged as modules, in this case two modules, 1 and 2, following one another.

Each module 1 and 2 comprises a printing machine 11, 21, making it possible to apply the finishing product, an ultraviolet oven 12, 22 making it possible to polymerize the finishing product, and a satining or graining machine 13, 23 intended to obtain the desired surface state.

Of course, the number of modules is a function of the number of layers of finishing product to be applied and can be increased or decreased relative to the one indicated in this example.

Figure 3:
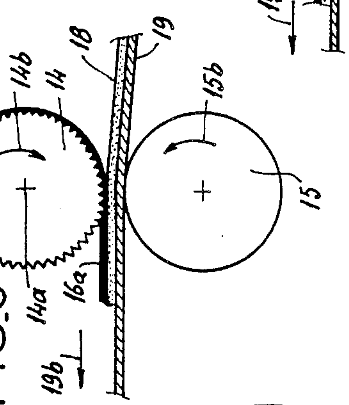
FIG. 3 is a direct functional diagram of the printing machine.
Figure 4:
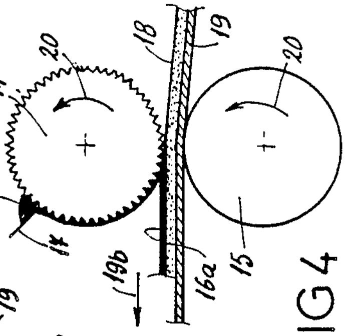
FIG. 4 is a reverse functional diagram of the printing machine.

Thus, as FIGS. 3 and 4 show particularly, each printing machine 11, 21 is a machine of the so-called thousand dot type.

It consists of two cylinders 14, 15 with horizontal axes placed above one another. Upper cylinder 14 is an engraved cylinder comprising a multitude of gravure cells 14a intended to receive finishing product 16.

A scraper 17 extending parallel to the axis of cylinder 14 in the upper part of the latter makes it possible to apply to the surface of the latter the desired amount of finishing product 16.

A conveyor belt 19 passes between the two cylinders 14 and 15 and brings between them the piece of leather or hide 18 that is to be coated with the finishing layer.

The two cylinders 14, 15 can turn in opposite directions to one another as indicated by arrows 14b and 15b as shown in FIG. 3, upper cylinder 14 turning in the direction opposite to the direction of travel 19b of conveyor belt 19.

For this reason, the amount of finishing product 16, deposited on the pieces 18 of leather or hide, is linked to the size of gravure cells 14a of cylinder 14 as well as the speed of rotation of cylinder 14.

In this case, the deposit of finishing product 16 will therefore be greater the faster cylinder 14 turns.

The two cylinders 14, 15 can also turn in the same direction at indicated by arrows 20 (cf. FIG. 4), this direction being the same as the direction of travel 19b of conveyor belt 19.

In this case, the amount of finishing product deposited is simply proportional to the size of gravure cells 14a.

It will be noted that cylinders 14, 15 allow the application of a uniform layer 16a of finishing product on the pieces of leather or hide 18.

Finishing product 16 is a liquid comprising 90 to 100% of active materials photopolymerizable under ultraviolet radiation. The product comprises unsaturated prepolymers, and liquid monomers to which photoinitiators are added.

The prepolymers consist of di- or trifunctional urethane acrylates comprising acrylic unsaturation and are in the form of liquids of low molecular weight. They can also comprise polyesters acrylates.

The liquid monomers are selected from the following compounds:

N-vinylpyrrolidone
Isobornyl acrylate
Dioctylphthalate
Tertiarybutylcyclohexane acrylate
Octyldecylacrylate
Ethyltriglycol acrylate.

The photoinitiators are preferably aromatic ketones which can be associated with tertiary amines as coinitiators. Preferably a mixture of diethylethioxantone/dimethylaminobenzoate is used.

The finishing product can also comprise dyes that can consist of:

mineral pigments, such as carbon black,
organic pigments,
metallized dyes.

These formulations can also contain from 0 to 5% of organic solvents intended to regulate the viscosity of finishing product 16 and to facilitate its application.

By way of nonlimiting example, a formulation of the finishing product according to the invention can be mentioned.

For 100 g of colorless formulation, there are:

| | |
|---|---|
| urethane-acrylate such as that marketed under the name "Ebecryl 210" | 55 g |
| polyester acrylate such as that marketed under the name "PE 55 F" | 11 g |
| N-vinylpyrrolidone | 11 g |
| isobornyl acetate | 11 g |
| dioctylphthalate | 12 g |

The photoinitiators used consist of a mixture of diethylthioxantone/dimethylaminobenzoate (DEXT/DBMI 11 dissolved at a rate of 4 to 8% by weight in the liquid N-vinylpyrrolidone monomers.

The viscosity of the finishing product is adjusted between 0.2 and 5 pascals/second by a mixture of N-vinylpyrrolidone/isobornyl acrylate.

If the finishing product is dyed, the percentage of pigments relative to the colorless formulation is variable and depends on the covering desired and the nature of the pigment which can be more or less absorbent of UV radiation. This therefore influences the percentage of photoinitiators integrated into the formulation.

During passage in ultraviolet radiation oven 12, 22, the photoinitiators cause crosslinking of the monomers and prepolymers to yield the final polymers.

It will be noted that this polymerization of the product occurs almost instantaneously.

In this case, the monomers play the role of diluents of the prepolymers but because of their reactivity they are integrated into the film of polymers that are being produced and therefore there is no evaporation of the product except 0 to 5% of organic solvents optionally contained in the finishing product.

Therefore it is understood that in this case, any drying operation is not longer necessary and that on leaving oven 12 a second layer of finishing product can be immediately applied in a second module 2 of the installation. Ultraviolet ovens 12, 22 are standard type ovens.

They each comprise a conveyor 25 of stainless material going right through this oven.

These conveyors are surmounted in a way known in the art by focusing lamps (not shown in the drawing) emitting ultraviolet radiation of a frequency between 150 and 700 mm.

After each oven 12, 22 is placed a satining or graining machine 13, 23 whose purpose it to enhance the gloss of the finishing layer (satining operation) or to imprint on this finishing layer a predetermined relief (graining operation). Each of these machines consists of two cylinders, an upper one 24 called a working cylinder, and lower feed cylinder 27, respectively with horizontal axes 26a and 27a. The working cylinder is heated between 60° and 160° C. and rests on pieces 18 with an adjustable pressure.

The latter are brought by an endless conveyor belt 28 which goes through the machine and passes between the two cylinders 26, 27.

Working cylinder 26 has a smooth surface in case it is desired to perform a satining operation and has a grained surface if it is desired to perform a graining operation.

The satining or graining machine is designed to allow easy changing of cylinder 26. As FIG. 1 shows, cylinders 26 and 27 turn in opposite directions (arrows **26*b* and 27*b*), the working cylinder turning in the same direction as conveyor belt 28 (arrow 28*b***).

As can easily be seen, the finishing apparatus according to the invention makes it possible to obtain, by a single pass in its different modules 1 and 2, the desired finishing layer and without need of further drying. In case of hair side leather, the deposit by passage is about 10 to 15 g/m$^2$ and the speed of passage is between 5 and 20 meters/minute.

It can be noted that the applied finishing layer, although generally dyed, can also be colorless.

The number of finishing layers applied depends, of course, on the desired finishing appearance.

However, with a printing machine making possible, by passage at a speed of about 10 m/min, a deposit between 10 and 25 g/m$^2$, this number of layers should not exceed three, to obtain a dry uniform film, so that, for practical reasons, the leather pieces do not become stiff and are easy to handle and stack.

In will also be noted that the viscosity of the pigmented formulation is between 0.2 and 5 pascals/-second.

Finally, the leathers obtained according to the invention in the form of precut pieces should, by way of illustration, respond to the following characteristics:

good behavior in the BALLY flexometer: no visible splitting or separation of the film after:

20,000 bendings wet 100,000 bends dry.

good behavior with VESLIC frictions: no or little discharge on the felt and no elimination of the film by separation after:

100 reciprocating movements wet 200 reciprocating movements dry.

Obtaining of these two essential characteristics should not be to the detriment of the appearance: uniformity of gloss and of covering and smooth, dry feel.

Figure 2:
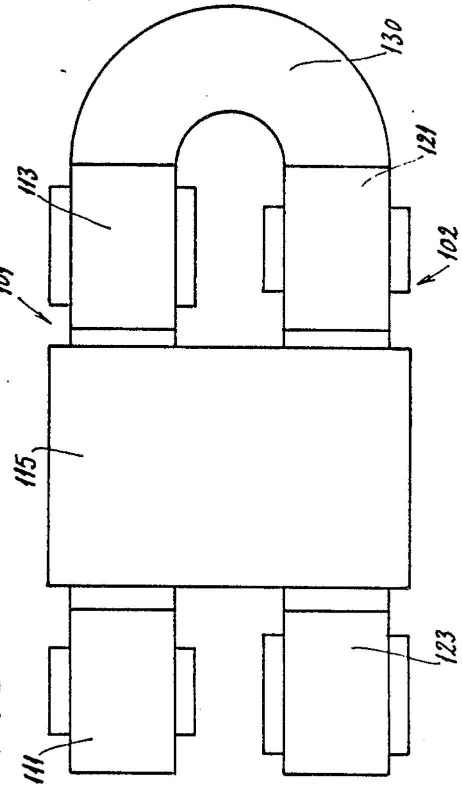
FIG. 2 is a diagram of the apparatus according to a second embodiment.

FIG. 2 shows another embodiment of the invention in which the apparatus also consists of two modules 101, 102 which here are not placed in a line but parallel to one another.

In this apparatus, as in the apparatus described above, each module 101, 102 consists respectively of a printing machine 111, 121, of an oven 115 and a satining or graining machine 113, 123. The only difference relative to the apparatus of FIG. 1 is in the fact that oven 115 extends both over the two modules 101 and 102, the other machines 111, 113, 121, 123 being identical with machines 11, 13 and 23 described above.

This arrangement makes it possible to have only one oven 115 for two successive modules and therefore is particularly advantageous.

In this case, satining or graining machine 113 of first module 101 is connected to printing machine 121 of second module 102 by conveyor 130 in the form of a half circle able to make the pieces coming from the first module and entering the second module make a half turn.

Of course, various conveyor belts 19, 25 and 28 of the different machines of each module are designed to perform a continuous conveying of each piece 18 of leather or hide that is to be treated from entry into the installation until leaving it.

Further, a system of regulation or coupling between these different belts an be provided to convey the pieces at the same speed.

It will noted that this arrangement makes it possible to have an entirely automatic feeding and evacuation of the installation.

According to an advantageous variant of the invention, the finishing apparatus comprises a station for dyeing by impregnation, that is standard and not represented in the drawing, and placed continuously ahead of continuous printing machine (11, 111) located at the head of the apparatus.

This arrangement makes it possible to complete the apparatus and to produce finished flexible materials having, in addition, a stable, quality dyeing.

In the case of scraped leather, i.e., fluffed and impregnated in a standard way in the dyeing station, two to three applications of a finishing layer with crosslinking after each pass are necessary. The deposit of the finishing product per pass is on the order of 20 to 25 g/m$^2$.

The apparatus according to the invention is particularly suited to treatment of flexible materials and in particular hides already cut since it does not involve any handling of them. It can, of course, also be applied to whole pieces.

The apparatus according to the invention therefore is particularly suited to treatment of flexible materials and in particular leather pieces even within enterprises for production of shoes or the like and therefore makes it possible to adapt quickly to the variable trends of the market.

Of course, in this case, systems will be provided to allow a fast cleaning of the printing machines as well as a fast change of the finishing product used.

If necessary, a suction or partial vacuum system can be provided at each conveyor belt to hold the pieces.

Also if necessary, a scraper type system can be provided at the printing and satining rolls to prevent adherence of treated pieces to them.

Of course, the invention is not limited to the sole examples of embodiment but, on the contrary, takes in all embodiments.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

What is claimed is:

1. A process for automatic finishing of leather and hides materials comprising the following steps performed substantially continuously:

applying to said material, with a continuous printing machine of the thousand dot type, a small amount of a finishing composition comprising from 90 to 100% of a photopolymerizable active material comprising unsaturated prepolymers, liquid monomers, and photoinitiators, said finishing composition being applied at a rate of 5 to 35 $g/m^2$ of said composition deposited per pass through said machine;

photopolymerizing said composition;

performing a satining or graining operation:

said steps being repeated until the desired finish is obtained on said leather and hides.

2. The finishing process according to claim 1 wherein the flexible material is first dyed by a continuous impregnation process.

3. The finishing process according to claim 1 wherein said finishing product is a product which is photopolymerizable under ultraviolet radiation.

4. The finishing process according to claim 1 wherein the unsaturated prepolymers are selected from the group consisting of urethane acrylates, polyester acrylates, and mixtures thereof.

5. The finishing process according to claim 1 wherein the liquid monomers are selected from the group consisting of N-vinyl pyrrolidone, isobornyl acrylate, dioctylphthatlate, tertiarybutylcyclohexane acrylate, octyldecylacrylate, and ethyltriglycol acrylate.

6. The finishing process according to claim 1 wherein the photoinitiators are selected from the group consisting of mixtures of diethylethioxantone and dimethylaminobenzoate.

7. The finishing process according to claim 1 wherein the number of applied finishing layers is limited to three and the amount of finishing product deposited per pass in the printing machine is from 10 to 25 $g/m^2$.

8. The finishing process according to claim 1 wherein the viscosity of the finishing product is between 0.2 and 5 pascals/second.

* * * * *